(12) United States Patent
Unger et al.

(10) Patent No.: US 6,199,381 B1
(45) Date of Patent: Mar. 13, 2001

(54) DC CENTERING OF FREE PISTON MACHINE

(75) Inventors: Reuven Z-M Unger; Douglas E. Keiter, both of Athens, OH (US)

(73) Assignee: Sunpower, Inc., Athens, OH (US)

(*) Notice: Subject to any disclaimer, the term of this patent is extended or adjusted under 35 U.S.C. 154(b) by 0 days.

(21) Appl. No.: 09/389,191

(22) Filed: Sep. 2, 1999

(51) Int. Cl.$^7$ ........................................ F01B 29/10
(52) U.S. Cl. ........................ 60/520; 92/5 R; 91/1; 91/361
(58) Field of Search ................... 60/517, 520; 92/5 R; 91/1, 361

(56) References Cited

U.S. PATENT DOCUMENTS

| | | |
|---|---|---|
| 4,183,214 | 1/1980 | Beale et al. . |
| 4,404,802 * | 9/1983 | Beale ................................... 60/520 |
| 4,433,279 * | 2/1984 | Bhate ................................... 322/3 |
| 4,583,364 | 4/1986 | Wood . |
| 4,602,174 | 7/1986 | Redlich . |
| 4,642,547 | 2/1987 | Redlich . |
| 4,649,283 | 3/1987 | Berchowitz et al. . |
| 4,864,232 | 9/1989 | Redlich . |
| 4,866,378 | 9/1989 | Redlich . |
| 4,912,409 | 3/1990 | Redlich et al. . |
| 4,926,123 | 5/1990 | Redlich . |
| 4,945,726 * | 8/1990 | Beale ................................... 60/520 |
| 5,148,066 | 9/1992 | Beale et al. . |
| 5,342,176 | 8/1994 | Redlich . |
| 5,385,021 | 1/1995 | Beale . |
| 5,461,859 | 10/1995 | Beale et al. . |
| 5,496,153 | 3/1996 | Redlich . |
| 5,537,820 | 7/1996 | Beale et al. . |
| 5,642,088 | 6/1997 | Unger . |
| 5,809,157 * | 9/1998 | Grumazescu ..................... 381/199 |
| 5,873,246 | 2/1999 | Beale . |

\* cited by examiner

*Primary Examiner*—Hoang Nguyen
(74) *Attorney, Agent, or Firm*—Frank H. Foster; Kremblas, Foster, Millard & Pollick

(57) ABSTRACT

In a free piston machine, a coil is mounted to its housing and magnetically linked to a permanent magnet or electromagnet on its piston member to form a linear motor. The coil and magnet are either added to embody the invention or are part of an AC linear alternator or AC linear motor which are a part of the free piston machine. A source of DC electrical current and a switch for connecting the DC source to the coil supply DC current to the coil when the switch is closed so that the coil and magnet temporarily operate as a DC linear motor until the piston is adequately centered for start-up without collision. The DC source voltage is temporarily applied to the coil to move the piston away from an end wall of the cylinder. This is accomplished by applying the DC current to the coil for a predetermined time interval, or by sensing when the piston has reached an adequately centered position.

13 Claims, 7 Drawing Sheets

DC CENTERING OF FREE PISTON MACHINE

CROSS-REFERENCES TO RELATED APPLICATIONS (Not Applicable)

STATEMENT REGARDING FEDERALLY-SPONSORED RESEARCH AND DEVELOPMENT (Not Applicable)

Reference to a "Microfiche appendix"

(Not Applicable)

BACKGROUND OF THE INVENTION

1. Field Of The Invention

This invention relates generally to free piston machines, such as free piston Stirling engines, free piston heat pumps, including coolers and cryocoolers, and linear compressors and pumps, and particularly relates to free piston machines which are connected to an AC linear electric motor or alternator. The invention is an apparatus for centering the free piston and its associated structures before an oscillating dynamic drive is applied to the free piston machine.

2. Description Of The Related Art

The prior art has and will continue to provide a broad spectrum of free piston machines. In a free piston machine, a piston linearly oscillates in a cylinder. However, the piston is free in the sense that the opposite ends of its displacement are unrestrained by mechanical linkages, such as cranks and rods or other motion transmitting structures which have components moving along specific limited paths. Ordinarily the amplitude of the reciprocation of a free piston varies as a function of loading and power. In some free piston machines the free piston is a part of the load to which power is directed and in others it is a part of the prime mover or drive. Usually the free piston is mechanically linked to other structures which reciprocate with the piston. Such other structures include linear electric motors or linear alternators. Therefore, the term "free piston member" is used herein to designate the combination of the free piston and the other component structures which are mechanically linked to the piston for reciprocating with it.

Because the entire piston member is free, there are conditions under which it will collide with structures which are positioned beyond either or both ends of its intended range of reciprocating motion. Such structures are herein termed "end walls". The term "end wall" refers generically to structures which may be struck if the piston moves beyond the intended limits of its axially oscillating reciprocation.

The need to avoid the collision of a piston member with an end wall is particularly acute in machines in which the piston is subjected to time varying gas pressures in two fluid spaces, each space bounded by an opposite end of the piston. When a free piston linearly oscillates in its reciprocating motion, it does so in opposite directions from an average position centered between its peak, axially opposite excursions. Because some net gas leakage through the gap between the piston and cylinder walls usually occurs from one fluid space to the other during each cycle of reciprocation, the gas masses in the two spaces gradually change. This change causes the center of reciprocation to creep toward the space with decreased mass. If this creep continues, the piston center position will eventually be displaced sufficiently far that the piston will collide with an end wall at one peak of its oscillating motion.

In order to avoid this consequence during the dynamic, steady state operation of a free piston machine, a variety of dynamic centering structures are used. These centering structures include both structures for maintaining a fixed center of reciprocation, as well as structures for limiting the end movement of the piston member to maintain piston member displacement within a safe range. Thus, the term "centering", as used herein, refers both to structures for maintaining a specific, fixed, center of reciprocation, as well as confining piston member displacement within range limits spaced sufficiently from the end walls to prevent collision. A few examples of dynamic centering structures are shown in the following patents, which are incorporated herein by reference: U.S. Pat. Nos. 4,183,214; 4,404,802; 4,583,364; 5,461,859; 5,385,021, 5,537,820; and 5,873,246.

Most free piston machines are operated at or near resonance because efficiency is much greater. Mechanical resonance requires a mass drivingly linked to an energy storage device, such as a spring. Therefore, the piston member is designed to have a mass which is mechanically resonant at the operating frequency of the free piston machine. The piston is linked to the housing by one or more springs. Such springs include helical and/or planar springs, gas springs, magnetic springs and the spring effect of compressible fluids in the spaces bounding the ends of the piston.

There are a variety of free piston machines. These include Beale-type free piston Stirling engines and heat pumping apparatus, such as coolers and cryocoolers, as well as free piston, linear compressors and pumps. Often these free piston machines have their piston mechanically linked to an AC electromagnetic linear transducer, such as a linear motor or linear alternator or other electrical generator. For example, a free piston Stirling engine linked to an alternator is able to use the heat of the external combustion of fuels to generate electricity and a free piston heat pumping apparatus linked to a linear motor can be used for cooling and cryocooling. An AC linear motor can drive a free piston in a cylinder having inlet and outlet valves to provide a gas compressor or fluid pump.

An AC electromagnetic, linear transducer, whether a motor or alternator, generally consists of a coil mounted to a housing for the machine and either a second coil electrically connected to operate as an electromagnet, or preferably a permanent magnet, mounted to the piston as a component of the piston member. There are also practical linear transducers of the moving coil type in which the coil is mounted to the piston as a component of the reciprocating piston member and the magnet, either a permanent magnet or an electromagnet, is mounted to the housing. The term "magnet" is used herein to refer collectively to both a permanent magnet and an electromagnet. Although an AC linear motor can also be formed by a coil and a high permeability, ferromagnetic material to form a reluctance motor operating like a solenoid, these are inefficient and therefore not preferred.

Examples of devices using linear alternators or linear motors are shown in the following U.S. Patents, which are hereby incorporated by reference: U.S. Pat. Nos. 4,602,174; 4,642,547; 4,649,283; 5,642,088; 4,912,409; 4,926,123; and 5,148,066.

When a free piston machine begins operation, it makes a transition from a static to a dynamic condition by initially linearly oscillating at small amplitudes of oscillation. The amplitude of these oscillations continues to increase until the machine reaches its steady-state operating conditions. Since most free piston machines are provided with mechanical or other springs which hold the free piston member away from the end walls under static conditions, these small transitional oscillations do not cause end wall collisions. As the oscillations grow, the dynamic centering structures, described above, for preventing end wall collisions during steady-state operation come into effect and prevent end wall collisions.

However, some free piston machines do not have springs which hold the static piston member away from end walls when the machine is not operating. Consequently, they require something to maintain the linearly oscillating piston member sufficiently far from the end walls during start-up to avoid collision. This is a particular problem for free piston machines in which the axis of reciprocation is vertical or has a vertical component of orientation. In such machines, gravitational forces, sometimes assisted by vibrations, cause the piston member to slide against an end wall when the machine is not in operation. If startup is initiated when the piston member is at or near an end wall when an oscillating dynamic drive is applied to the free piston machine, the piston member will, of necessity, repeatedly bang or collide against the end wall until the amplitude of oscillation is sufficiently large that the dynamic centering structure becomes operable. Because many of these dynamic centering structures rely upon one or more ports in the piston and cylinder walls coming into registration when the piston is in a centered position, a substantial time interval can pass before the piston oscillation amplitude becomes sufficiently large that centering can be effected.

There is, therefore, a need for a static centering apparatus for use with those free piston machines in which the piston member is capable of creeping toward an end wall when the machine is not operating so that the static centering apparatus will prevent periodic collisions during start-up of the free piston machine.

It is therefore an object and feature of the present invention to provide an apparatus to move a static piston member from its rest position into a position at which the dynamic centering system will become operable during start-up in order to avoid end wall collisions.

BRIEF SUMMARY OF THE INVENTION

The invention uses a coil mounted to the housing and magnetically linked to a piston member component, such as a permanent magnet or electromagnet, to form a linear motor. Although these components can be provided exclusively for practicing the invention, preferably the coil and the piston member component to which the coil is magnetically linked, most preferably a permanent magnet, are both part of an AC linear alternator or AC linear motor which are a part of a free piston machine. The invention further includes a source of DC electrical current and a switch connecting the DC source to the coil for supplying DC current to the coil when the switch is closed so that the coil and piston member component to which it is magnetically linked operate as a DC linear motor until the piston is adequately centered for start-up without collision. The DC source voltage is temporarily applied to the coil to move the piston away from an end wall of the cylinder. This may be accomplished by applying the DC to the coil for a predetermined time interval, or by sensing when the piston has reached an adequately centered position.

Figure 1:
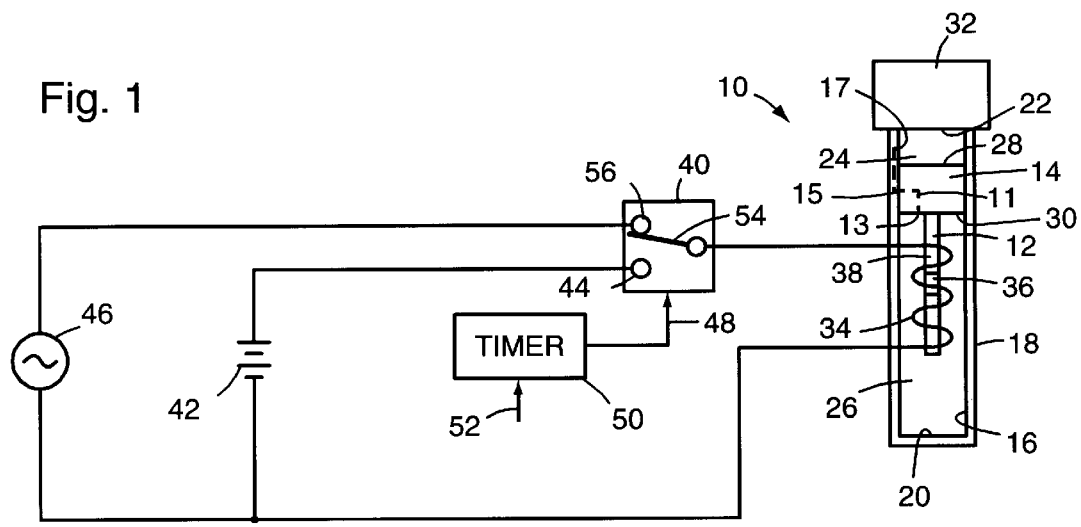
FIGS. 1–3 are simplified diagrams illustrating the principles of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other circuit elements where such connection is recognized as being equivalent by those skilled in the art. In addition, circuits are illustrated which are of a type which perform well-known operations on electronic signals. Those skilled in the art will recognize that there are many, and in the future may be additional, alternative circuits which are recognized as equivalent because they provide the same operations on the signals.

DETAILED DESCRIPTION OF THE INVENTION

FIG. 1 illustrates a free piston machine 10 having a piston member 12. The piston member 12 includes a piston 14 slidably reciprocable in a cylinder 16 formed in a housing 18. The cylinder or housing has an end wall 20 and an opposite end wall 22. The piston 14 separates a first fluid space 24 from a second fluid space 26, so that each of these fluid spaces bound opposite ends 28 and 30 of the piston 14.

The free piston machine 10 is also provided with a conventional centering system, the simplest of which is illustrated in FIG. 1. This centering system has a passageway 11, which extends from a port 13 opening into the space 26, through interfacing ports at 15, formed in the interiorly facing cylinder wall and outwardly facing piston wall, and finally through a port D, opening into space 24.

The free piston machine 10 is vertically oriented. Consequently, before start-up the piston member 12 will move downwardly under the force of gravity into contact with the end wall 20.

The free piston machine 10, shown in FIG. 1, diagrammatically illustrates a broad variety of types of free piston machines, which are known in the prior art. Such machines typically have a further component 32, which, depending upon the type of free piston machine, may be, for example, a compressor or pump valve mechanism or the displacer, regenerator and heat exchange structures of a free piston Stirling engine or free piston Stirling heat pumping device, commonly referred to as heat pumps, coolers or cryocoolers.

A coil 34 is mounted to the housing 18 and is magnetically linked to a piston member component 36 to form a linear motor. The preferred piston member component 36 is a permanent magnet mounted by a connecting rod 38, or other mechanical linkage, to the piston 14. Consequently, the components of the piston member 12 are mechanically linked together and reciprocate together and include the linkage rod 38, the piston member component 36 and the piston 14.

A single pole, double throw switch 40 alternatively connects the coil 34 to a source 42 of DC electrical current for supplying DC current to the coil when the switch circuit through switch contact 44 is closed or for connecting the coil 34 to an AC source 46, or other AC circuit.

The coil 34 may be the coil of an AC linear alternator, the coil of an AC linear motor or a coil installed for the purpose of practicing the present invention. If the coil 34 is the coil of an alternator the AC source 46 will instead be an AC load. Similarly, a magnet or electromagnet component 36 may also be used principally for an AC linear motor or alternator or may be installed for practicing the present invention.

The control input 48 of the switch 40 is connected to an electronic timer circuit 50. The timer circuit, upon receiving a manual, electrical, mechanical or other input signal at its input 52, initiates a conventional timing cycle to switch the wiper 54 of the switch 40 to contact 44 for applying a DC voltage to the coil 34 so that the combination of the coil 34 and magnet 36 operate temporarily as a DC linear motor. Obviously, the voltage polarity must be properly selected to move the piston member in the desired direction. When the timing interval of the timer 50 times out after a selected period of time, the timer applies a signal to the control input 48 of switch 40 to switch the wiper to the terminal 56. This terminates the DC linear motor operation and substantially immediately initiates AC linear motor or alternator operation to apply an oscillating dynamic drive.

The time of operation of the timer 50, during which the DC source 42 is applied to the coil 34, may be determined experimentally for each free piston machine. The time interval is the time needed to move the piston member 12 away from the end wall 20 and near the position at which the centering ports on the piston and cylinder walls become interfacing at 15 so that the centering passageway 11 becomes operable. Thereafter the switch 40 is switched to apply the AC source 46 to the coil 34 so that the oscillating, dynamic drive becomes operable to initiate the oscillating, linear motion of the piston member 12.

The length of time during which the DC source is applied to the coil to actuate the coil as a DC linear motor is usually not critical because the piston 14 ordinarily works against a gas in one or both of the spaces 24 or 26. This gas acts like a gas spring with leakage past the piston seals. Therefore, the gas spring force limits acceleration and velocity of the piston motion under force of the DC electromagnetic linear motor. As an example, in one machine it was experimentally determined that an appropriate time interval was 4 or 5 seconds.

Although a single pole, double throw switch is illustrated in the drawing, additional poles and additional switch positions may be included for accomplishing additional purposes. For example, an off position can be added if an off switch is not included with the AC load or source 46. Although it is preferred that the switch 40 be a relay with its control input 48 being the relay coil, there are a variety of other devices and circuits which are commonly referred to as switches in the electronic art and can be used. The term "switch" is used in the broad electronic sense to refer to a variety of switching devices and circuits, including necessary conductors, to turn electrical current on and off and which have a control input for switching between the on and off states. These include the well-known examples of relays, triacs and transistors, which are commonly utilized as switches. The control inputs of such switches are typically the coil of a relay, the gate of a triac or MOSFET transistor, or the base or other terminal of a bipolar transistor, all of which are used in well known transistor configurations for providing a switching function. These circuits usually include supporting circuit elements, such as bias and current limiting resistors and protection diodes. Typically electronic switches have inputs connected to a control circuit or drive circuit, of which there are many types. Typically switch control circuits receive an input signal, such as a voltage or current, and have a reference voltage or current for comparison to the input voltage or current. They turn the switch on or off as the voltage or current magnitude rises above or falls below a set point reference. Switch drive circuits may include or be only a voltage, current or impedance transforming circuit or biasing circuit for changing magnitudes to values acceptable to the input of the device being driven.

Figure 2:
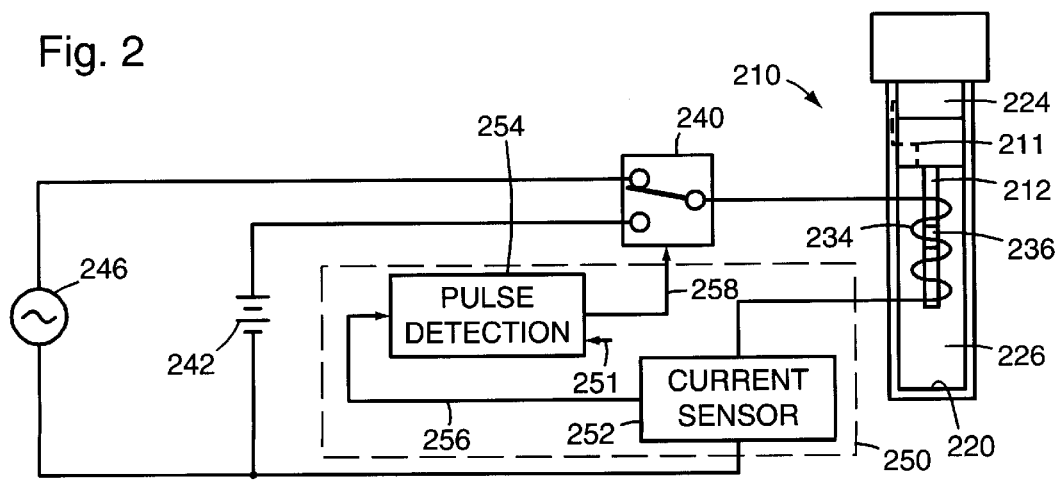

FIG. 2 illustrates an alternative embodiment of the invention. It has a generically represented free piston machine 210, connected through a switch 240 to a DC source 242 and alternately to an AC source 246. However, instead of the timer 50 illustrated in FIG. 1, the circuit of FIG. 2 has a position sensing circuit 250, consisting of a current sensor 252 and a pulse detector 254. The current sensor 252 may, for example, be a low resistance resistor for providing a voltage drop representing the current through the coil 234. The output 256 is connected to the input of the pulse detector 254, which in turn is connected to the control input 258 of the switch 240.

An inherent characteristic of the free piston machine 210 is that the gas in the spaces 224 and 226 has a low flow rate leakage from one of the spaces to the other when the piston is driven by application of the voltage source 242 to the coil 234. Consequently, the piston will move slowly away from the end wall 220 until the centering passage 211 provides communication between the spaces 224 and 226. When that communication occurs, the flow resistance between the spaces 224 and 226 is reduced as a step function. The piston member 212 consequently has an acceleration and step function increase in velocity. This sudden increase in the velocity of the magnet 236 generates a current spike in the series circuit comprising the current sensor 252, the DC source 242, the switch 240 and the coil 234. This current spike is converted to a voltage spike by the current sensor 252 and detected by the pulse detector 254. In response to the spike, the pulse detector 254 switches the switch 240 away from connection of the coil 234 to the DC source 244 and into connection of the coil 234 with the AC source 246.

Consequently, in the operation of the embodiment of FIG. 2, a manual or signal input 251 to the pulse detector 254 will switch the switch 240 so that it applies the voltage of the DC source 242 to the coil 234, thereby moving the piston member 212 away from the end wall 220. When the piston member 212 reaches the position where the dynamic centering system becomes operable, the spike is generated and detected by the pulse detector 254 which switches the switch 240 to connect the coil 234 to the AC source 246.

Figure 3:
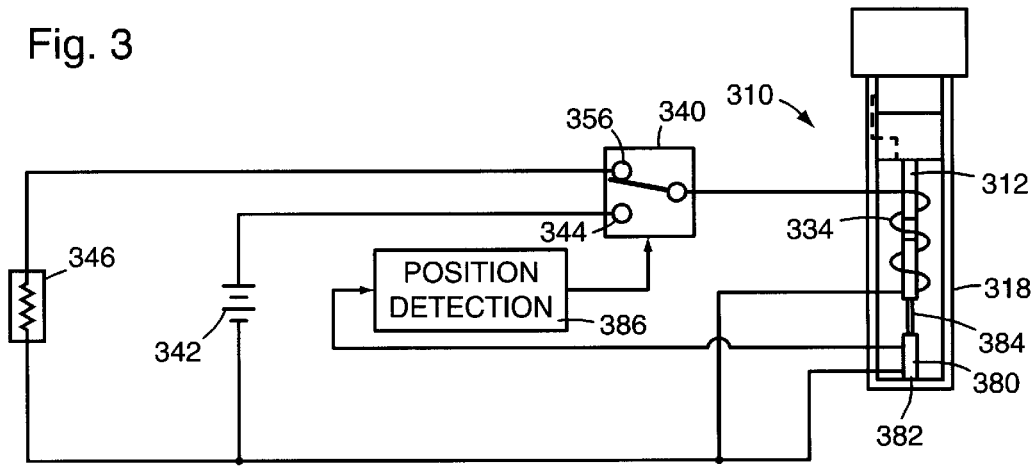

FIG. 3 illustrates yet another alternative embodiment of the invention. The Stirling machine 310 has a coil 334, which is connectable through terminal 356 of switch 340 to an AC load 346, if the free piston machine includes an alternator using the coil 334. Although the free piston machine 310 may be any of the types described above, the use of an alternator and the AC load 346 illustrates one variation.

Instead of detecting the piston member position from the currents flowing in the circuit supplying power to the coil as illustrated in FIG. 2, the embodiment of FIG. 3 illustrates that it is also possible to use any one of several position sensing or displacement transducers which are or may become available. FIG. 3 illustrates the use of a displacement transducer 380, which has one end 382 connected to the housing 318 and a movable opposite end 384 connected to the piston member 312. The displacement transducer 380 provides a signal to a position detector circuit 386, which in turn switches the switch 340 from contact with terminal 344, which applies voltage from DC source 342 to the coil 344, into contact with the terminal 356 when the piston member 312 arrives at a selected, sufficiently centered position.

The prior art has a broad variety of applicable position sensing devices and circuits for metering the displacement of a reciprocating body. Examples are illustrated in the following patents, which are herein incorporated by reference: U.S. Pat. No. 4,864,232; 4,866,378; 5,342,176; and 5,496,153.

Although the most important aspect of the invention is moving the piston member away from an end wall of the cylinder by temporarily applying a DC voltage to the coil, in some situations it may be desirable to first apply the DC voltage in the opposite polarity in order to move the piston member to a known position against an end wall. This is desirable in free piston machine applications where the static position of the piston member is uncertain and the timing method is used to terminate application of the DC voltage to the coil. An uncertain piston member position exists, for example, when the gas leakage past the interfacing piston and cylinder walls is small and there is no other gas communication between the two gas spaces. It also exists where there is only a small vertical component to the axis orientation and particularly if the free piston machine is subjected to vibration when in a static state.

Where the piston member position is uncertain, the DC voltage may first be applied to the coil at a polarity so that the effective DC linear motor will move the piston member to an end wall of the cylinder. This permits the piston member to always begin from the same position when it is then moved away from the end wall by temporarily applying a DC voltage to the coil at the opposite polarity.

Figure 5:
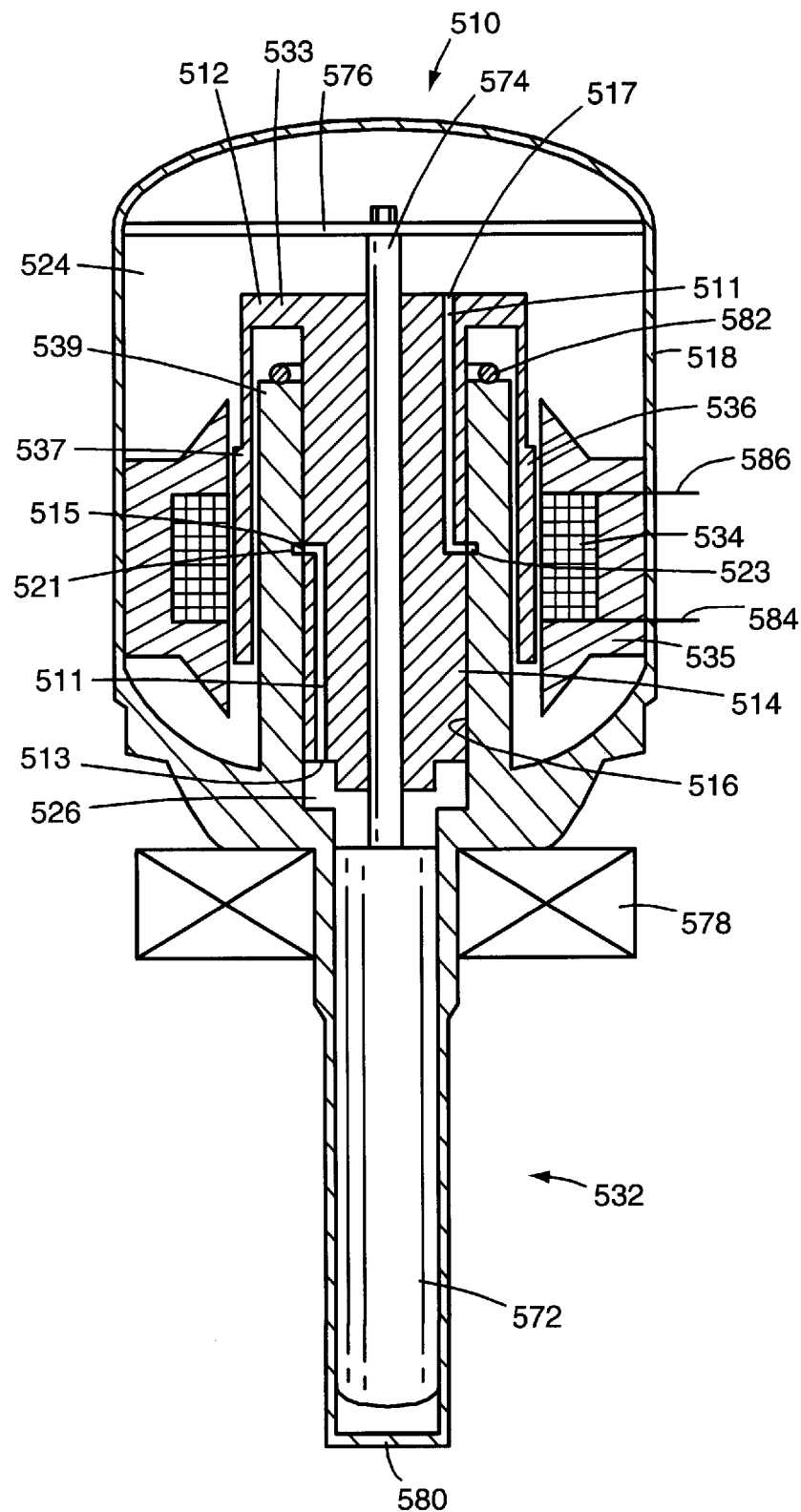
FIG. 5 is a diagram of a free piston machine to which the present invention is applied.

FIG. 5 illustrates a free piston machine 510 in the form of a cryocooler driven by an AC linear electric motor. It is not described in detail because its features are not unique to the present invention and there are many other free piston machines which can be used with the invention. The free piston machine 510 has a piston member 512, which includes a piston 514, slidable in a cylinder 516 formed within a housing 518. The piston is provided with a centering system consisting of a passageway 511. The passageway 511 extends from a port 513 through a port 515, formed in the piston 514. An annular groove 521 is formed in the cylinder so that the gas can communicate from the port 515 around to the remaining interfacing port 523 and continuing through the passageway to its outlet at port 517. Consequently, one port at the end of the passageway 511 opens into the gas space 526, while the opposite port 517 opens into the gas space 524 to provide the communicate to maintain the centering when the piston member is at the position illustrated in FIG. 5.

The piston 514 is connected through an integrally formed flange 533 to permanent magnets 536 and 537. The permanent magnets 536 and 537 reciprocate with the piston 514. A circular coil 534 is located in a first annular pole piece 535. Magnets 536 and 537 reciprocate between the annular pole piece 535 fixed to the housing 518 and a second pole piece 539 also fixed to the housing 518. Since the free piston machine 510 is a Stirling cycle cryocooler, it also has a displacer 572 which contains a regenerator and is mounted by a connecting rod 574 to a planar spring 576. The free piston machine 510 also has a heat rejecting system 578 for rejecting heat pumped from its cold tip 580.

The free piston machine 510 is illustrated in a vertical orientation. As a consequence, the piston 514, under static conditions, will fall downwardly until the annular flange 533 seats against an O-ring 582. The O-ring provides some cushioning to prevent the piston flange 533 from falling directly against the upper end of the inner pole piece 539. The conductors 584 and 586 connected to the coil 534 are connected to circuitry embodying the present invention for temporarily applying a DC voltage to the coil 534 in a polarity which temporarily applies an upward force on the magnets 536 and 537 until the AC source is applied to the conductors 584 and 586.

Figure 4:
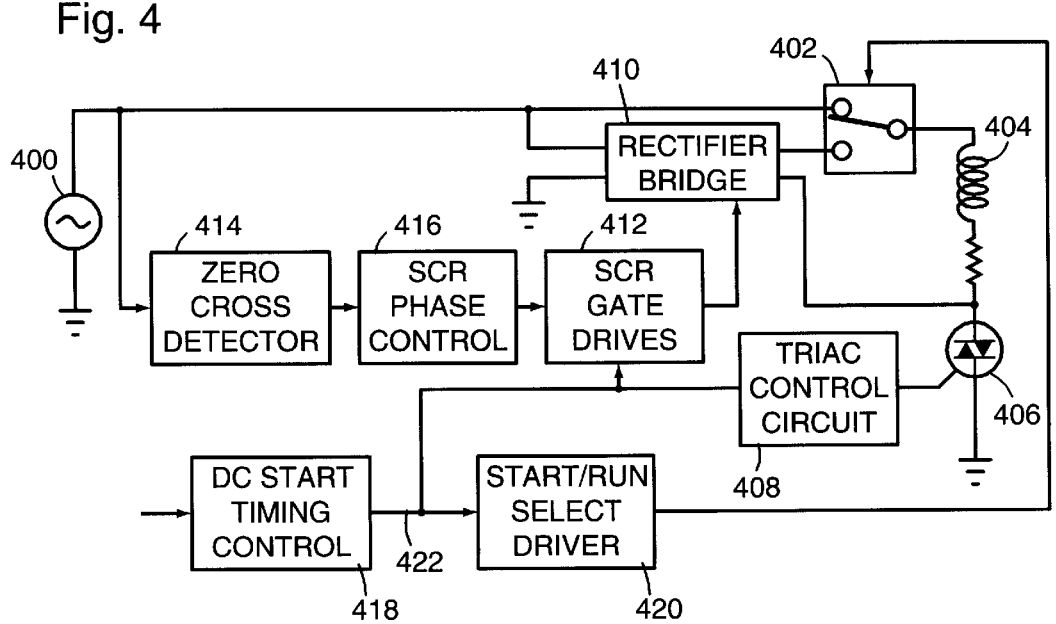
FIG. 4 is a block diagram of the electrical circuitry embodying the present invention.

FIG. 4 is a block diagram of the preferred embodiment of the invention and FIGS. 6–9 illustrate details of most of that block diagram. Therefore, FIGS. 4 and 6–9 are described simultaneously and the identical reference numerals from FIG. 4 are used in FIGS. 6–9 where applicable.

Figure 6:
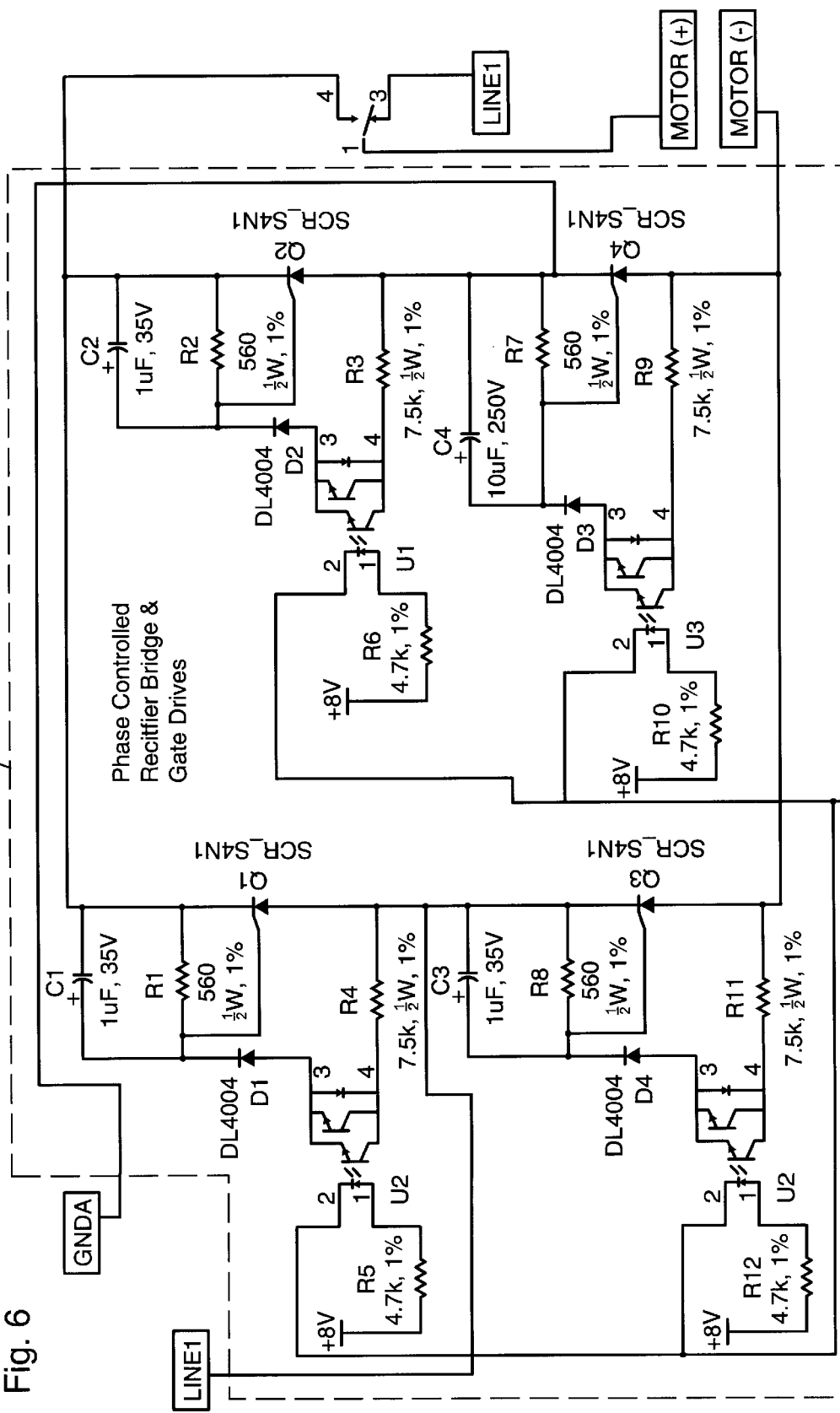
FIGS. 6, 7, 8 and 9 are schematic diagrams of the details of the preferred embodiment of the invention.
Figure 7:
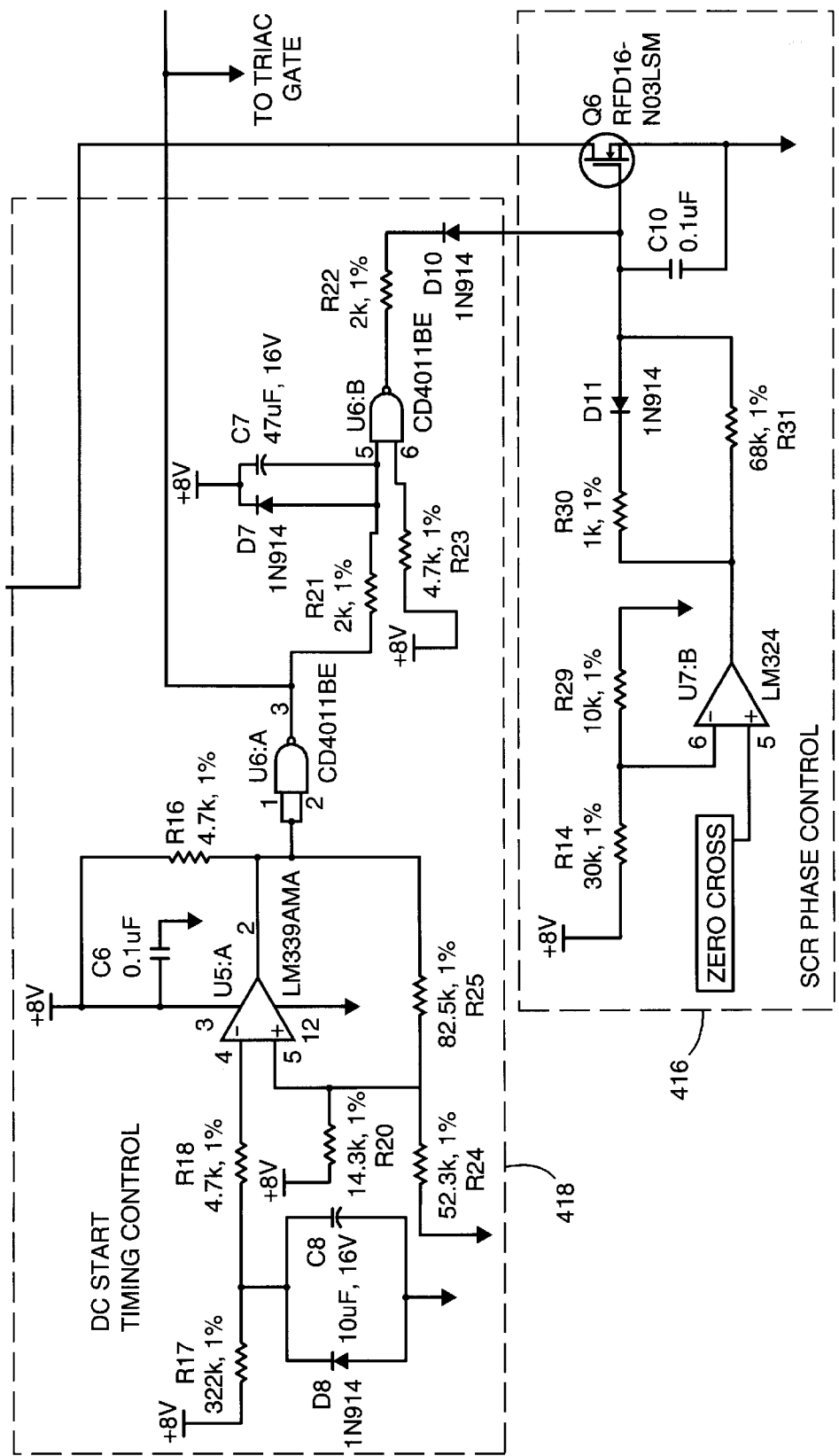
Figure 8:
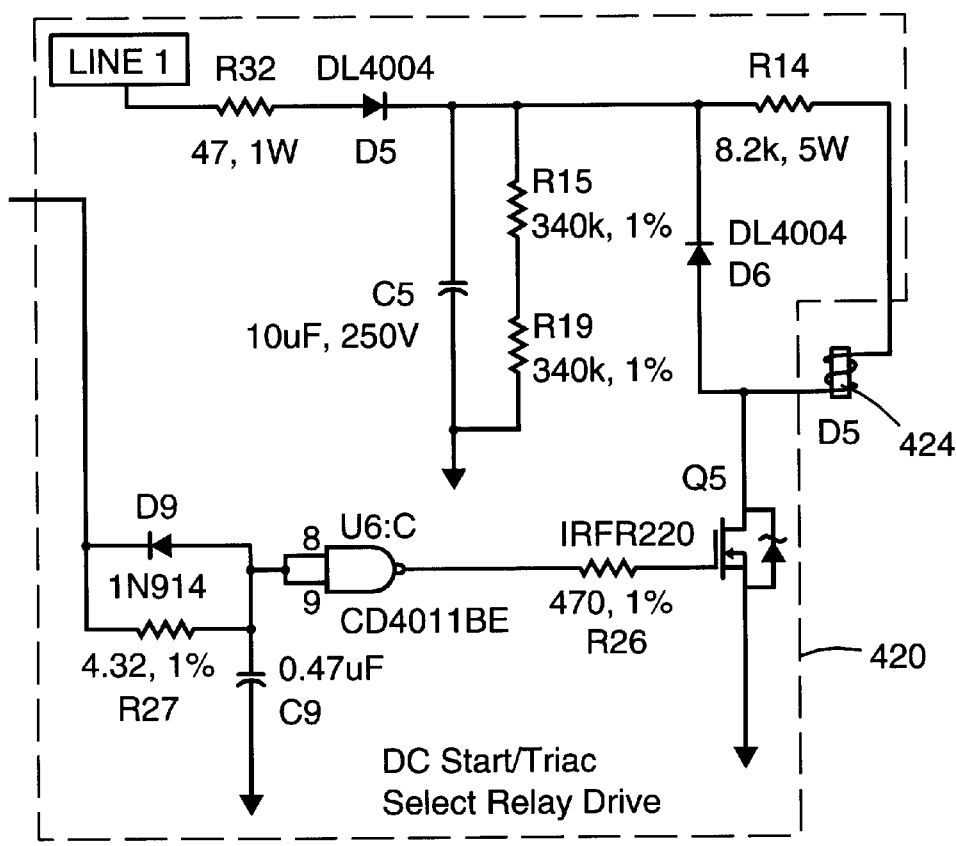
Figure 9:
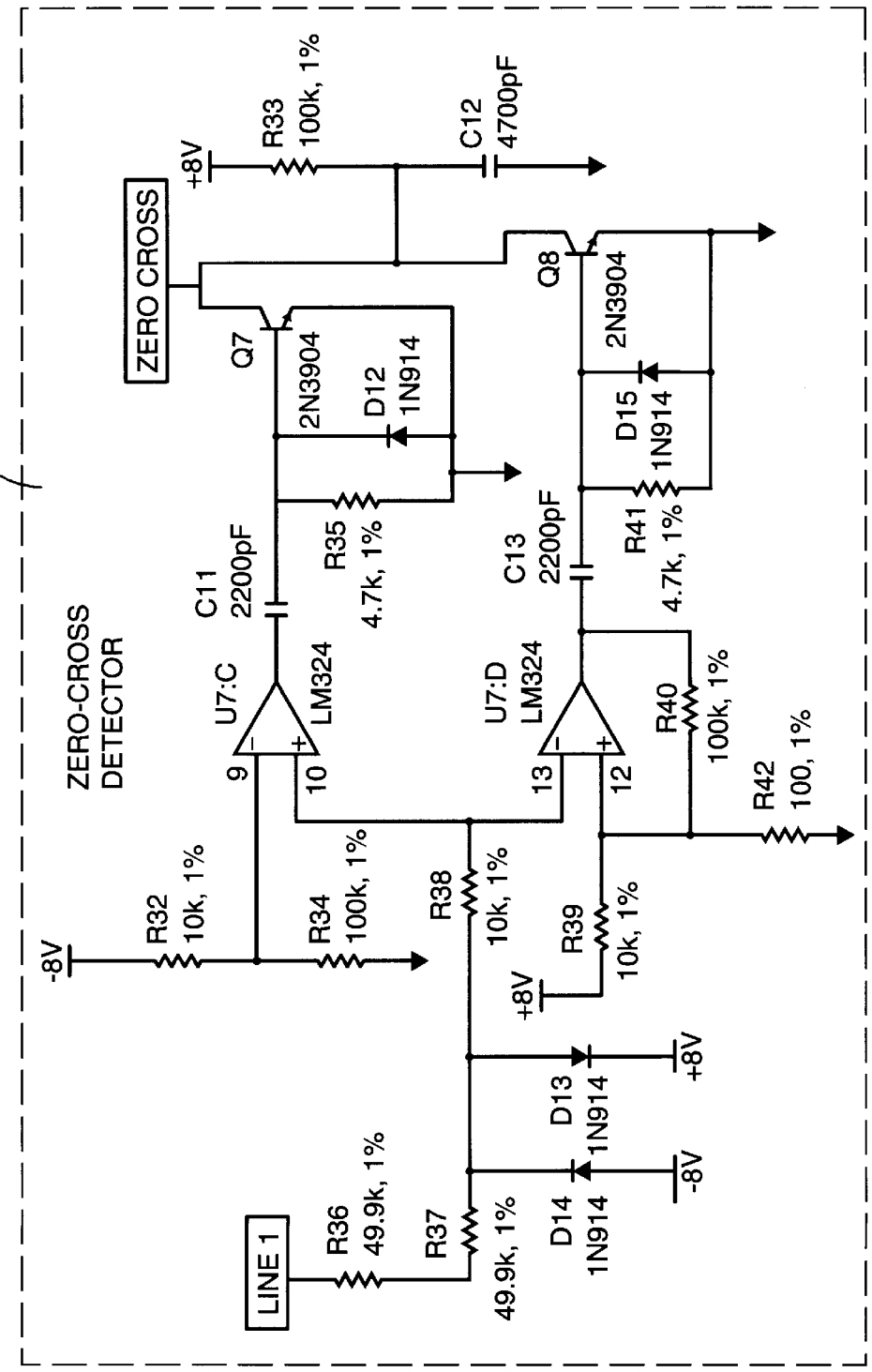

An AC source or load 400 is connected through the normally closed contacts of relay terminals 402 to coil 404. AC current is controlled by a series connected triac 406, controlled by a triac control circuit 408. The triac control circuit is not illustrated in detail because such circuits are well known and conventional. The source of DC voltage is provided by a silicon controlled rectifier bridge circuit 410. The SCRs of the rectifier bridge 410 are controlled by SCR gate drive circuit 412. The bridge rectifier 410 and its gate drive 412 are illustrated in FIG. 6 within the dashed lines 410/412. A zero cross detector circuit 414 detects the time at which the voltage of the AC source or load 400 crosses zero voltage so that the SCRs of the rectifier bridge 410 may be fired by the phase control circuit 416 at a desired phase lag after the zero crossover. The firing phase is selected to provide a safe and effective DC current to temporarily operate the coil as the armature winding of a DC linear motor. The rectifier bridge and its driving circuits are circuits of a type known in the prior art and therefore are not described in further detail.

Timing is accomplished by the DC start timing control 418. The timing cycle for the timing control 418 is initiated by power up of the circuit when it is desired to start the free piston machine. The output of the timing control circuit 418 is applied to both the SCR gate drives 412, as well as a start/run select driver 420. The output 422 of the timing control 418 has a first state upon initiation of a timing interval and a second state at the end of the timing interval. Consequently, the start/run select driver 420, which drives the relay coil 424 (FIG. 8), switches the switch 402 between the DC voltage output of rectifier bridge 410 and the AC source or load 400 in the manner described above. The output 422 of the timing control 414 is also applied to the SCR gate drives 412 in order to prevent firing of the SCRs when the DC voltage from the rectifier bridge 410 is not applied to the coil 404.

While certain preferred embodiments of the present invention have been disclosed in detail, it is to be understood that various modifications may be adopted without departing from the spirit of the invention or scope of the following claims.

What is claimed is:

1. A piston centering apparatus for moving a free piston member, which includes a piston slidably reciprocatable in a cylinder formed in a housing member, away from an end wall, the piston separating two fluid spaces bounding its opposite ends, the apparatus comprising:

(a) a coil mounted to one of said members and magnetically linked to the other of said members to form a linear motor;

(b) a source of dc electrical current; and (c) a switch circuit connecting the dc source to the coil, for supplying dc current to the coil in a polarity to drive the piston away from the end wall when the switch circuit is closed.

2. An apparatus in accordance with claim 1 wherein the switch has a control input connected to a timer circuit for closing the switch and actuating the linear motor for a selected period of time.

3. An apparatus in accordance with claim 1 wherein the switch has a control input connected to a piston member position sensing circuit for opening the switch and stopping actuation of the linear motor in response to a selected piston member position.

4. An apparatus in accordance with claim 3 wherein the piston member includes a magnet as a piston member component magnetically linked to the coil and wherein the position sensing circuit includes an impedance connected in series with the switch, the coil and the dc source and wherein the apparatus further comprises passages formed in the housing for dynamically centering the piston by permitting fluid from one of the fluid spaces to flow to the other fluid space when the piston is in a centered position and a pulse detector having an input connected to the impedance and an output connected to the switch control input for opening the switch in response to detection of a pulse when the piston is at a position permitting said fluid flow.

5. In a free piston apparatus having a piston slidably reciprocatable in a cylinder formed in a housing member and a magnet mechanically linked to one of said members and magnetically linked to a coil mounted to the other said member to form an AC electromechanical linear transducer, the piston separating two fluid spaces bounding its opposite ends, a piston centering apparatus for moving the piston away from an end wall of the cylinder, the apparatus comprising:

(a) a source of dc electrical current; and (b) a switch connecting the dc source to the coil, for supplying dc current to the coil when the switch is closed to operate the coil and magnet as a dc linear motor.

6. An apparatus in accordance with claim 5 wherein the switch has a control input connected to a timer circuit for closing the switch and actuating the linear motor for a selected period of time.

7. An apparatus in accordance with claim 6 wherein the switch has at least two positions, one position for connecting the coil to said dc source and a second position for connecting the coil to an ac circuit.

8. An apparatus in accordance with claim 5 wherein the switch has a control input connected to a piston position sensing circuit for opening the switch and stopping actuation of the dc linear motor in response to a selected piston position.

9. An apparatus in accordance with claim 8 wherein the switch has at least two positions, one position for connecting the coil to said dc source and a second position for connecting the coil to an ac circuit.

10. An apparatus in accordance with claim 8 wherein the position sensing circuit includes an impedance connected in series with the switch, the coil and the dc source and wherein the apparatus further comprises passages formed in the housing for dynamically centering the piston by permitting fluid from one of the fluid spaces to flow to the other fluid space when the piston is in a centered position and a pulse detector having an input connected to the impedance and an output connected to the switch control input for opening the switch in response to detection of a pulse when the piston is at a position permitting said fluid flow.

11. A method for initiating the start up of a free piston apparatus having a piston slidably reciprocatable in a cylinder formed in a housing member and a magnet mechanically linked to one of said members and magnetically linked to a coil mounted to the other said member, the method comprising:

moving the piston away from an end wall of the cylinder by temporarily applying a dc voltage to the coil.

12. A method in accordance with claim 11 wherein the apparatus is static before the dc voltage is applied to the coil and an oscillating dynamic drive is applied to the apparatus substantially immediately after disconnecting the dc voltage from the coil.

13. A method in accordance with claim 12 and further comprising: first applying a dc voltage to the coil at a voltage polarity driving the piston to an end of the cylinder and subsequently applying a dc voltage at the opposite polarity to drive the piston away from the end.

* * * * *